United States Patent Office 2,823,194
Patented Feb. 11, 1958

2,823,194

FLOOR TILE COMPOSITIONS FROM PETROLEUM RESINS

John F. McKay, Jr., Cranford, and Anthony H. Gleason, Westfield, N. J., assignors to Esso Research and Engineering Company, a corporation of Delaware No Drawing. Application December 22, 1952
Serial No. 327,410

3 Claims. (Cl. 260—41)

This invention relates to improved resin compositions and, more particularly, to novel compositions composed of petroleum resins and isoolefin polymers and copolymers and to such compositions especially adapted for use in floor tile formulations.

It is known that hydrocarbon resins can be produced from certain refinery streams containing olefins and diolefins by a variety of methods such as polymerization using Friedel-Crafts catalysts. Steam cracked streams have been found especially useful for this purpose. The resins produced from certain fractions, however, have softening points that are generally too low for certain applications, such as, for example, in floor tile compositions. For use as the binding ingredient in floor tile, for example, it is desirable that hydrocarbon resins have softening points of about 95–100° C. or greater so that the floor tiles made therefrom have the required indentation characteristics, flexibility, and impact resistance. Most of the resins that are produced from such hydrocarbon streams by Friedel-Crafts polymerization have softening points lower than 100° C. Attempts to raise the softening points of these resins have seriously degraded the color of the resins. This is undesirable since light colored resins are premium materials. In fact, substantially the only way the low melting point resins can be used at present is as extenders for the more expensive high softening point resins such as the coumarone-indene resins. Post-polymerization treatment of the resins having low softening points can be used to raise the resin softening points to levels where good tiling may be made but these modifications add to the cost of the resin and, in some cases, degrade resin color.

There has now been discovered a process whereby novel mixtures of petroleum resins with isobutylene polymers and isobutylene-diolefin copolymers can be prepared and employed as floor tile formulations. The polymer added to the mixture is used instead of the pitch type plasticizer ordinarily employed. No post-polymerization treatment of the resin is required.

Hydrocarbon resins to which the present invention is applicable, are made by treating a hydrocarbon mixture containing 10 to 35% diolefins and 30 to 65% olefins and 0 to 60% of aromatics, paraffins, and naphthenes with 0.25–2.5% of a Friedel-Crafts type catalyst such as aluminum chloride, aluminum bromide, boron trifluoride, and the like, or solutions, slurries or complexes thereof. A hydrocarbon mixture suitable for resin production is conveniently found in hydrocarbon streams obtained by steam cracking gas oils. The cracked streams used as a feed for making the resin have boiling ranges between 20° and 280° C., or may be composed of any intermediate fraction selected from this range. The reactions are conducted at temperatures in the range of −100 to +100° C. (preferably −35 to +65° C.). Residual catalyst is quenched by suitable methods, such as addition of methyl alcohol and subsequent filtration, or by water and/or caustic washing. Washing with aqueous acid may also be used. The final solution is then stripped of unreacted hydrocarbons and low molecular weight oils by vacuum or steam distillation. The product is a substantially non-aromatic, unsaturated hydrocarbon resin. The petroleum distillate resins synthesized by this method usually have softening points lower than 95° C.

The rubbery polymer component of the novel formulations may be either a homopolymer of an isoolefin having from 4 to 8 carbon atoms or it may be a copolymer of an isoolefin of 4 to 8 carbon atoms with a diolefin having from 4 to 8 carbon atoms, preferably a conjugated diolefin such as butadiene, isoprene and dimethylbutadiene. The isoolefin-diolefin copolymers may be made by the disclosure of U. S. 2,356,128. The polymers having a major proportion of isobutylene and minor proportion of a conjugated diolefin such as isoprene and butadiene are known generally as butyl rubber. These polymers and copolymers are made by the polymerization of olefinic feeds with Friedel-Crafts catalysts at controlled temperatures.

The exact amount of the polymer or copolymer required to give optimum tile qualities depends on the softening point and consistency of the resin. Generally, the amount of rubbery plasticizer used varies between 10 and 50 weight percent based on the amount of petroleum resin. As an illustration, with 15 parts of a resin softening at 75° C., 3.5 parts of polymer can be advantageously used. Five parts of polymer may be used with 15 parts of a resin softening at 90° C. The molecular weight of the polymer or copolymer is not critical for the purposes of the invention. Quite surprisingly, however, high molecular weight materials can be quite satisfactorily used in these compositions as plasticizers. Polyisobutylene ranging from about 7,000 to 200,000 Staudinger molecular weight and isoolefin-diolefin copolymers with Staudinger molecular weights ranging from 7,000 to 200,000 or higher can be used in the tile formulation. A typical floor tile formulation is as follows:

| Material: | Parts by weight |
|---|---|
| Petroleum hydrocarbon resin (soft. pt. 82° C.) | 15 |
| Isobutylene-isoprene copolymer | 4 |
| Titanium dioxide | 3 |
| Asbestos | 39 |
| Marble dust | 39 |

The copolymer rubber is thoroughly mixed with the resin binder on a rubber mill at about 150° F. The temperature is then raised to about 300° F. and the filters are added and mixed. The stock may then be either sheeted from a calendering mill in tile form or it may be molded into tiles in a press. Mixing of the stock may also be accomplished in a Banbury mixer or any other suitable mixing or kneading device.

Other materials examined as plasticizers for low softening resins in tile compositions do not give tiles meeting specifications in all respects. Failure in indentation occurs when the plasticizer is increased to the point where the tile just passes flexure and impact requirements. Among the plasticizers which were tried with negative results are the pitch types and aromatic types.

Only a small amount of polymer or copolymer relative to total tile composition is required to give proper balance to tile properties. High molecular weight isobutylene-diolefin copolymers and polyisobutylene are effective in the compositions although normally such materials are not considered as plasticizers.

The employment of these compositions for producing asphalt floor tiles from low melting petroleum resins gives other desirable properties to the tiles which are not obtained when conventional pitch-type plasticizers are used with high melting coumarone-indene resins, for instance. The combination of low melting hydrocarbon resins together with rubbery polymers in the compositions of the invention gives a high degree of ductility or internal cohesiveness to the tiles. This greatly reduces breakage of the tiles during laying operations and reduces the danger of cracking due to subsequent impact. Furthermore, the resin polymer tile binder has a very high viscosity index. This permits tiles to be formulated having room temperature indentation values on the high end of the scale permitted by specifications and still falling below the maximum value permitted for 115° F. indentation test. This means that such tiles have excellent "foot comfort" (are less tiring to walk on), yet have excellent resistance to indentation by heavy furniture, desks, etc. The tile binder of our invention has a certain degree of resiliency which conventional asphalt tile binders do not have. Thus, tiles made with these compositions are similar to rubber flooring in their recovery from indentation and in quietness.

The following examples will serve to illustrate the mode of operation as well as show the advantages of the present invention, though it will be understood that various other embodiments or modifications not specifically illustrated herein are possible without departing from the spirit or scope of the invention.

EXAMPLE 1

Hydrocarbon streams containing olefins, diolefins, aromatics, and saturated hydrocarbons obtained by steam cracking of gas oils were polymerized in the presence of a Friedel-Crafts type catalyst. The resins were recovered by stripping off the unreacted hydrocarbons by vacuum distillation. Analysis in each case indicated that the resin was of an essentially non-aromatic structure, since little or none of the aromatic constituents of the feed entered the composition. Polymerization data are summarized in Table I.

Table I

| Run No. | 1 | 2 | 3 | 4 | 5 | 6 | 7 | 8 | 9 |
|---|---|---|---|---|---|---|---|---|---|
| Approx. Boiling Pt. (° C.) | 20–48 | 20–125 | | 38–130 | 48–130 | | 30–280 | 85–260 | |
| Composition, Wt. Percent (Approx.): | | | | | | | | | |
| Diolefins | 30 | 20 | | 19.4 | 12 | | 15 | 15 | |
| Olefins | 60 | 48 | | 50.6 | 50.9 | | 62 | 45 | |
| Aromatics: | | | | | | | | | |
| Benzene | | 25 | | 22 | 28.5 | | 4.5 | | |
| Toluene | | 6 | | 7 | 7.6 | | 10.1 | 10 | |
| Higher | | | | | | | 7.2 | 15 | |
| Paraffins, Naphthenes | 10 | 1 | | 1 | 1 | | 1.2 | 15 | |
| Polymerization: | | | | | | | | | |
| Catalyst | AlCl₃ | AlCl₃ | AlCl₃ | AlCl₃ | AlCl₃ | BF₃ | AlCl₃ | AlCl₃ | BF₃ |
| Temperature (° C.) | 15 | 25 | 100 | 45 | 45 | 25 | 25 | 20 | 50 |
| Resin, Wt. Percent ¹ | 65–85 | 25–35 | 19 | 30–36 | 18–23 | 15 | 20–30 | 16 | 11 |
| S. Pt.¹ (° C.) | 70–85 | 70–90 | 66 | 85–95 | 80–95 | 74 | 85–100 | 96 | 76 |

¹ The exact softening point and yield depend upon the degree of work-up of the resin, such as stripping conditions, etc. Softening Points determined by ASTM E–28–51–T.

The data in Tables II and III illustrate the invention. It can be seen that the experimental floor tiles embodying the improved composition pass specifications on indentation, flexure, impact resistance, and curl resistance. The tiles also have adequate soap and caustic resistance. Typical data are also included in Tables II and III for tiles made from low softening resins with conventional pitch-type plasticizer to show that such tiles do not pass the specifications. The compositions are based on 100 parts by weight of floor tile. The rest of the tile is composed of inert fillers such as asbestos, marble dust and pigment.

Table II.—Tile compositions

| Composition Number | Isobutylene-Isoprene Copol. | | Polyisobutylene | | Pitch Plasticizer, Parts | Resin, Parts | Resin,¹ Soft. Pt., ° C. |
|---|---|---|---|---|---|---|---|
| | Parts | M. W. × 1,000 | Parts | M. W. × 1,000 | | | |
| 1 | 3.5 | 40 | | | | 15 | 75 |
| 2 | 4 | 40 | | | | 15 | 82 |
| 3 | 4 | 60 | | | | 15 | 82 |
| 4 | | | 4 | 40 | | 15 | 81 |
| 5 | | | | | 2 | 15 | 82 |
| 6 | | | | | 3 | 15 | 82 |
| 7 | | | | | 4 | 15 | 84 |
| 8 | | | | | 6 | 15 | 84 |

¹ Ring and ball method (ASTM E–28–51T).

Table III.—Tile evaluations

| | McBurney Indent., mils | | | Flexure, Inches, at Break | Impact Resistance | Curl, Inches |
|---|---|---|---|---|---|---|
| | 77° F. | | 115° F., 30 sec. | | | |
| | 1 min. | 10 min. | | | | |
| Tile No.: | | | | | | |
| 1 | 9 | 12 | 28 | 0.4 | Pass | 0.00 ⎫ |
| 2 | 9 | 12 | 26 | 0.4 | ...do... | 0.00 ⎬ Pass all Federal Specifications. |
| 3 | 9 | 12 | 24 | 0.4 | ...do... | 0.00 ⎪ |
| 4 | 11 | 15 | 27 | 0.9 | ...do... | 0.01 ⎭ |
| 5 | 2 (fail) | | 27 | 0.8 | Fail | ⎫ |
| 6 | 4 (fail) | | 33 | 0.8 | Pass | ⎬ Do not pass all Federal Specifications. |
| 7 | 6 (fail) | | 51 (fail) | 0.8 | ...do... | ⎪ |
| 8 | 10 | | 57 (fail) | 0.8 | ...do... | ⎭ |
| Federal Specifications for Asphalt Tiles (SS–T–306a). | 7–20 | 11–27 | 38 max. | 0.4 min. | ...do... | 0.03 max. |

EXAMPLE 2

Table IV below shows data on a number of tile formulations which were made up and tested. The tile compositions were composed of 15 parts of resin, rubbery plasticizer as indicated, 3 parts titanium dioxide, and equal parts of asbestos and marble dust to make a total of 100 parts. It is seen from these data that both isobutylene-diolefin copolymers and polyisobutylene are effective and that molecular weight of the rubbery material is not critical. It should be noted, however, that other materials such as natural rubber, butadiene-styrene copolymer, butadieneacrylonitrile copolymer and isobutylene-styrene copolymer are not completely satisfactory in the tile compositions.

What is claimed is:

1. A floor tile composition which consists essentially of the milled admixture of 15 parts by weight of a petroleum resin prepared by polymerizing in the presence of a Friedel-Crafts catalyst a steam-cracked distillate boiling in the range of 20° to 280° C. and consisting essentially of 10 to 35% diolefins, 30 to 65% olefins, and 0 to 60% aromatics, paraffins, and naphthenes; 2 to 7 parts by weight of an uncured rubbery polymer having a molecular weight between 7,000 and 200,000 and selected from the group consisting of polyisobutylene and the copolymer of a major proportion of isobutylene and a minor proportion of isoprene; and 78 to 83 parts by weight of

*Table IV.—Evaluation of floor tiles from resins and rubbery polymers*

| Tile No. | Resin Soft. Pt., °C. | Tile Formulation, parts | | | | Tile Evaluations [1] | | | | | |
|---|---|---|---|---|---|---|---|---|---|---|---|
| | | Resin | Rubbery Plasticizer | | | McBurney Indent., mils | | | Flexure, inches, at Break | Impact | Curl, Inches |
| | | | Parts | Material | Molecular Weight | 77° F. | | 115° F., 30 sec. | | | |
| | | | | | | 1 min. | 10 min. | | | | |
| 9 | 57 | 15 | 2 | Copolymer [2] | 50,000 | 14 | 19 | 32 | 2.0 | Pass | .00 |
| 1 | 75 | 15 | 3.5 | ----do [2] | 40,000 | 9 | 12 | 28 | 0.4 | ---do--- | .00 |
| 10 | 75 | 15 | 4 | ----do [2] | 80,000 | 14 | 19 | 30 | 0.8 | ---do--- | |
| 11 | 82 | 15 | 4 | ----do [2] | 40,000 | 9 | 13 | 24 | 0.4 | ---do--- | |
| 3 | 82 | 15 | 4 | ----do [2] | 60,000 | 9 | 12 | 24 | 0.4 | ---do--- | .00 |
| 12 | 82 | 15 | 4 | Oil extended copolymer [4] | | 9 | 12 | 26 | 0.4 | ---do--- | .02 |
| 13 | 89 | 15 | 5.5 | Copolymer [2] | 40,000 | 11 | 16 | 27 | 2.0 | ---do--- | |
| 14 | 99 | 15 | 6 | ----do [2] | 40,000 | 11 | 17 | 35 | 2.0 | ---do--- | |
| 4 | 80 | 15 | 4 | Polyisobutylene | 40,000 | 11 | 15 | 27 | 1.0 | ---do--- | .01 |
| 15 | 127 | 15 | 7 | ----do | 60,000 | 9 | 11 | 16 | 0.5 | ---do--- | |
| 16 | 129 | 15 | 7 | ----do | 40,000 | 8 | 9 | 13 | 0.4 | ---do--- | |
| 24 | 82 | 15 | 5.2 | ----do | 9,000 | 18 | 21 | 28 | 1.1 | ---do--- | |
| 17 | 82 | 15 | 2.5 | Natural Rubber | | 11 | 18 (fail) | 38 | 1.2 | Fail | |
| 18 | 75 | 15 | 4 | Butadiene-styrene copolymer | | 16 | 23 | 56 (fail) | 0.35 (fail) | Pass | |
| 19 | 82 | 15 | 5.5 | Butadiene-acrylonitrile copolymer | | 10 | 12 | 37 | 0.2 (fail) | ---do--- | |
| 20 | 82 | 15 | 6 | Isobutylene-styrene copolymer | | 5 | 6 (fail) | 19 | 0.2 (fail) | ---do--- | |
| 21 | 77 | [3] 15 | 4 | Copolymer [2] | 40,000 | 3 | 3 (fail) | 8 | 0.08 (fail) | ---do--- | |
| 22 | 77 | [3] 15 | 7 | ----do [2] | 40,000 | 4 | 5 (fail) | 17 | 0.15 (fail) | ---do--- | .02 |
| 23 | 114 | [3] 15 | 9 | ----do [2] | 50,000 | 6 | 6 (fail) | 10 | 0.15 (fail) | ---do--- | |

[1] Federal Specifications for Asphalt Tile (SS-T-306a).
[2] Copolymer used was isobutylene-isoprene copolymerization product known as butyl rubber.
[3] Coumarone-indene resins.
[4] Copolymer extended with 13% Forum 40 oil by mill mixing before tile formulation.

EXAMPLE 3

Table V shows additional formulations which are satisfactory. Resins of three different softening points, 63°, 77° and 90° C., were used to make these experimental tiles. For the control, tiles were made with coumarone-indene resin and pitch plasticizer. Tests showed that all these tiles pass federal specifications.

inert inorganic filler of the class consisting of titanium dioxide, asbestos, marble dust, and mixtures thereof.

2. A composition according to claim 1 wherein the rubbery polymer is polyisobutylene.

3. A composition according to claim 1 wherein the rubbery polymer is a copolymer of a major proportion of isobutylene and a minor proportion of isoprene.

*Table V.—Floor tile evaluation*

| Tile No. | Tile Formulation | | | | McBurney Indent., mils | | | Flexure (inches) | Impact | Curl, Inches |
|---|---|---|---|---|---|---|---|---|---|---|
| | Resin | | Plasticizer | | 77° F. | | 115° F., 30 sec. | | | |
| | Parts | Soft. Pt., °C. | Parts | Type | 1 min. | 10 min. | | | | |
| 28 | 15 | 63 | 2.75 | Copolymer [1] | 9 | 13 | 23 | .45 | Pass | .00 |
| 25 | 15 | 77 | 4 | ----do [1] | 10 | 14 | 28 | .45 | ---do--- | .00 |
| 26 | 15 | 90 | 5.5 | ----do [1] | 7 | 10 | 18 | .5 | ---do--- | .00 |
| 27 (control) | 15 | [2] 112 | 12 | Pitch | 12 | 17 | 22 | .6 | ---do--- | .00 |

[1] Isobutylene-isoprene copolymer.
[2] Coumarone-indene resin.

References Cited in the file of this patent

UNITED STATES PATENTS

| | | |
|---|---|---|
| 2,234,660 | Thomas | Mar. 11, 1941 |
| 2,356,128 | Thomas et al. | Aug. 22, 1944 |
| 2,500,755 | Jones | Mar. 14, 1950 |
| 2,523,150 | Schneider et al. | Sept. 19, 1950 |
| 2,559,498 | Garber et al. | July 3, 1951 |